United States Patent [19]
Simpson et al.

[11] 3,941,178
[45] Mar. 2, 1976

[54] APPARATUS AND METHOD FOR DISPLAYING THE MEASUREMENT OF A TIRE

[75] Inventors: John R. Simpson, Charlotte; Robert E. Lozier, Jr., Monroe, both of N.C.

[73] Assignee: El-Trol, Inc., Charlotte, N.C.

[22] Filed: Apr. 19, 1974

[21] Appl. No.: 462,404

[52] U.S. Cl. ............ 157/13; 51/106 R; 51/DIG. 33; 235/92 DN; 235/92 CC; 235/92 TF; 235/92 R; 33/142
[51] Int. Cl.² ................. B29H 21/08; G06M 3/00
[58] Field of Search ....... 235/92 DN, 92 CC, 92 TF, 235/92 V, 92 DM, 92 FQ, 92 EA, 151.32; 250/571, 560; 242/75.52; 33/142; 425/17; 51/DIG. 33, 106; 157/13

[56] References Cited
UNITED STATES PATENTS

| | | |
|---|---|---|
| 3,172,208 | 3/1965 | Lowy .................................... 33/142 |
| 3,564,219 | 2/1971 | Mutziger ........................ 235/92 TF |
| 3,644,718 | 2/1972 | Osborne et al. ................. 235/92 DN |
| 3,834,648 | 9/1974 | Rose et al. ..................... 235/92 DN |

*Primary Examiner*—Joseph M. Thesz, Jr.
*Attorney, Agent, or Firm*—Parrott, Bell, Seltzer, Park & Gibson

[57] ABSTRACT

The measurement of a tire is displayed during rotation of the tire and buffing thereof by an apparatus and method in which a first train of electrical pulse signals are generated which characterize the rotational speed of the tire, a second train of electrical pulse signals are generated which characterize the linear surface speed of the crown surface of the tire which is being buffed, and the ratio of pulses in the two trains is displayed as indicative of a measurement of the tire.

11 Claims, 4 Drawing Figures

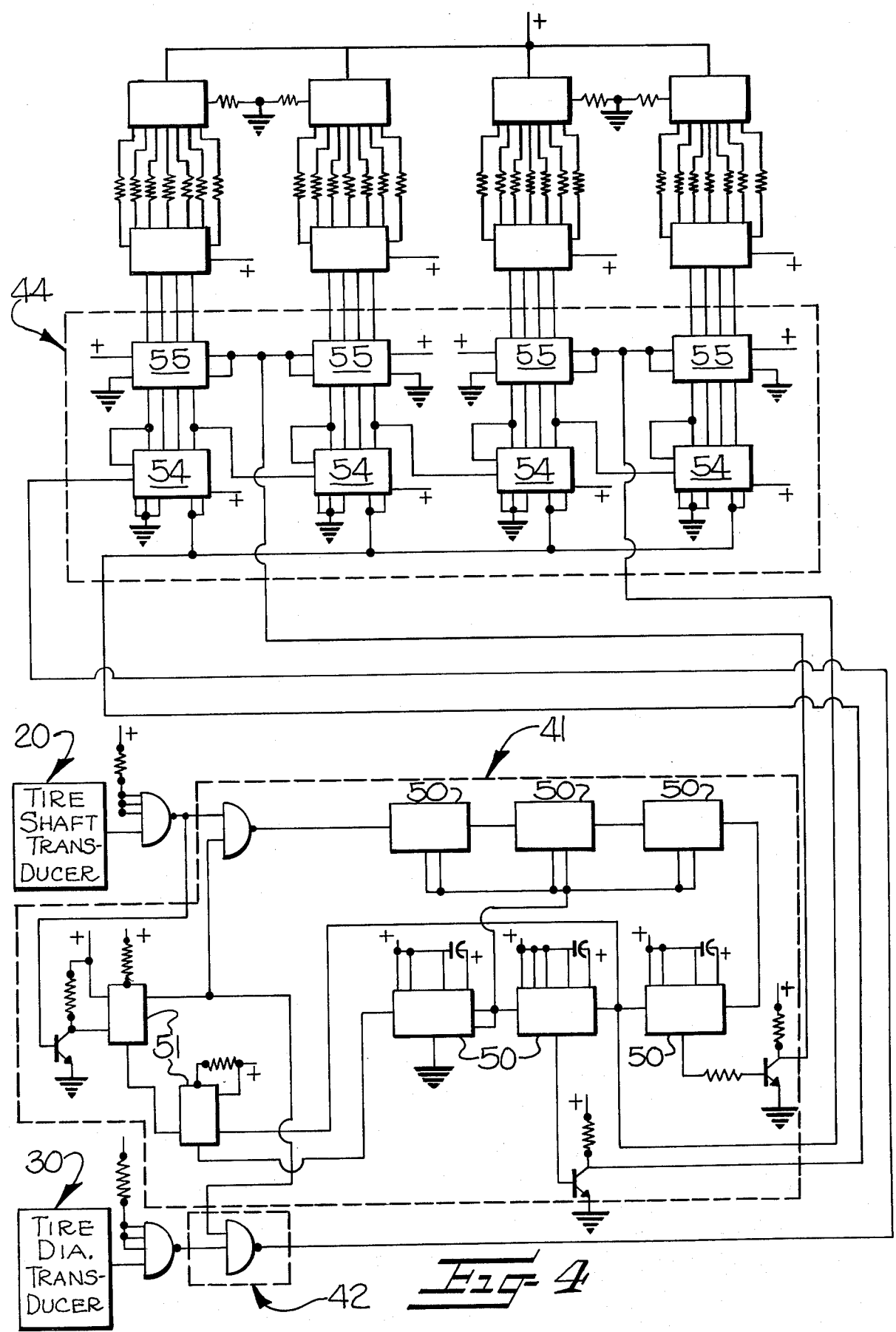

APPARATUS AND METHOD FOR DISPLAYING THE MEASUREMENT OF A TIRE

Many industrial processes and apparatus used in such processes provide for removing material from an annular outer surface of a workpiece, such as by abrasion. In many of such processes and apparatus, the diameter of the workpiece is of importance. One primary example of such apparatus and processes occurs in the tire retreading industry, where previously used tire carcasses are prepared for renewal by the removal of tread material from a peripheral crown surface of the tire.

By way of example, the retreading of a tire through use of any method by which the tire carcass is enclosed within a substantially rigid mole requires that both the dimensions of the mold and the dimensions of the tire carcass be carefully determined. This is necessary in order to assure that the proper quantity of rubber for retreading is applied to the tire carcass, in correlation with the space available between the tire carcass and the enclosing member. The necessity for accurate determination of the dimensions of a buffed tire carcass has become of increasing importance with the spreading use of tire carcasses of belted radial construction, as such carcasses have more limited capability of accommodating improperly coordinated dimensions.

Heretofore, the practices and apparatus used in determining the diametrical measurement of a workpiece, such as a tire being buffed, have varied with the particular industrial process but have typically involved physical measurement. By way of example, a machinist operating a machine tool typically will interrupt operation of the tool from time to time in order to apply a manual caliper to the workpiece. In the specific instance of a tire being buffed, it has been conventional practice to interrupt the buffing operation and apply to the circumference of the peripheral crown surface of a tire a tape calibrated to measure diameter.

It has been found that such procedures and apparatus, typical of careful craftsmanship, may achieve acceptable results if properly applied. However, actual practice in many instances falls far short of the required level of skill, with resultant difficulty in subsequent manufacturing processes. In particular, most operators of buffing machines in tire retreading shops come very quickly to rely on estimations of diameter made by eye, with subsequent difficulty in proper bonding of retread materials.

With the above discussion in mind, it is an object of the present invention to display digitally a measurement of a tire during the time that material is being removed from the crown surface of the tire. In realizing this object of the present invention, two trains of electrical pulse signals are generated, one of which characterizes the rotational speed of the tire and the other of which characterizes the linear surface speed of the crown surface from which rubber is being removed. The signals thus generated are then ratioed one against the other to determine a digital value which is displayed as indicative of a measurement of the tire.

It is a further object of this invention to permit the operator of a tire buffing apparatus to operate the apparatus in accordance with a method by which the measurement of a tire being buffed is displayed simultaneously with the process of buffing. By realizing this object of the present invention, an operator may be instructed as to a particular digital value of diameter to which tires of a given size are to be buffed and may then readily follow such instructions. By this means, work assignment for a tire buffer operator is simplified.

Yet a further object of this invention is the provision of an accessory arrangement applicable to existing tire buffing apparatus by which a first signal generating means is operatively connected with a shaft means which mounts a tire for rotation during buffing, a second signal generating means is operatively driven from the moving peripheral crown surface of the tire being buffed, pulses derived from the first signal generating means are counted to establish a period for diametrical measurement, and pulses originating for the second signal generating means are counted during the time required to count a predetermined number of first signal pulses and then are displayed as indicative of the diameter of the tire being buffed.

Some of the objects of the invention having been stated, other objects will appear as the description proceeds, when taken in connection with the accompanying drawings, in which FIG. 1 is a schematic perspective view of an apparatus in accordance with the present invention, including a block diagram representative of certain circuit means;

FIG. 4 is an electrical circuit diagram of circuit elements shown in block form in FIG. 1.

Figure 1:
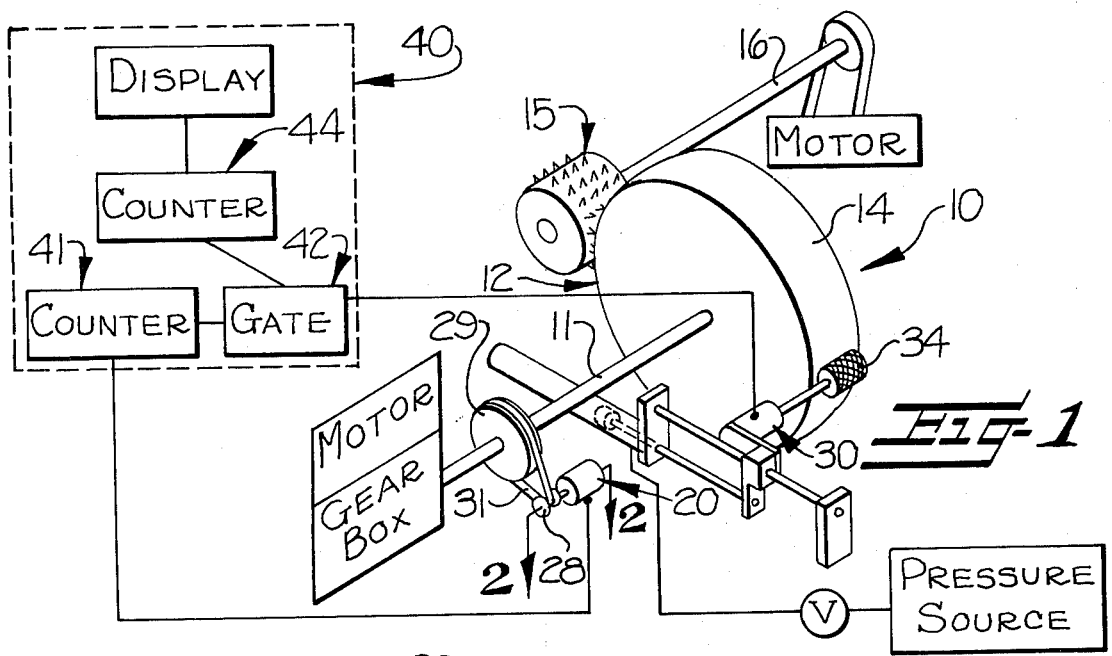
Figure 2:
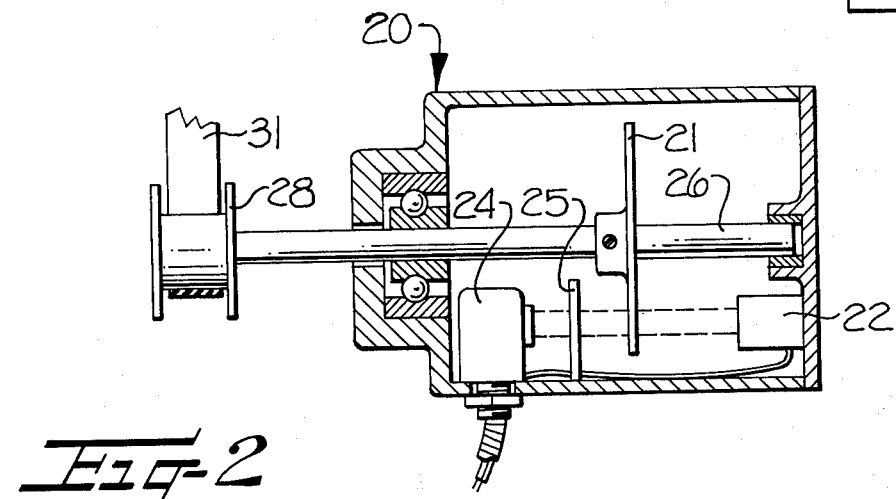
FIG. 2 is an enlarged scale sectional view of a signal generating device incorporated in the present invention.
Figure 3:
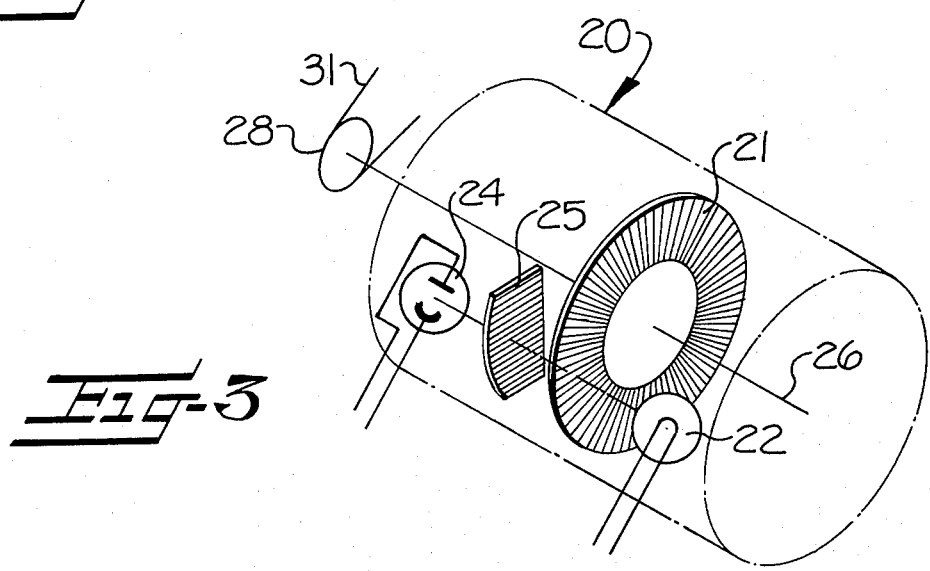
FIG. 3 is a partly schematic perspective view of the device of FIG. 2.

While the method and apparatus of the present invention will be described hereinafter with particular reference to the accompanying drawings and the environment of a tire buffing apparatus, it is to be understood at the outset of the following description that it is contemplated that this invention may be varied as to detailed specifics. Accordingly, the specific description now to be given is to be understood only as describing the best mode and use of the present invention contemplated at the time of this application, and is not to be taken as limiting upon the scope of this invention.

Referring now more particularly to the drawings, a tire buffing apparatus is there shown and generally indicated at 10. The apparatus 10 includes a shaft 11 for mounting a previously used tire carcass 12 for rotation during buffing of a peripheral crown surface 14 by a buffing wheel or rasp 15. In the particular apparatus shown, the rasp 15 is mounted on a driven shaft 16 which is generally parallel to the tire mounting shaft 11 and spaced therefrom. However, it will be recognized by persons knowledgeable in the art of tire buffing apparatus that many alternate arrangements are possible. Many of such alternate arrangements are illustrated in previously issued patents, to which the interested reader is referred. It is contemplated that the present invention may be applicable to any such apparatus known from prior patents or developed hereafter.

In accordance with this invention, a first signal generating means 20 is operatively connected with the tire mounting shaft 11 for generating a train of electrical pulses which characterize the rotational speed of the tire being buffed. The details of the first signal generating means 20 will be described more fully hereinafter.

In further accordance with the present invention, a second signal generating means 30 is operatively associated with the peripheral crown surface 14 of the tire 11 for generating a train of electrical pulses which characterize the linear surface speed of that surface during rotation of the tire. As with the first signal generating means, the specific structure of the second signal generating means 30 will be described more fully hereinafter.

It will be understood that, during operation of the apparatus of this invention and in accordance with the method of this invention, the first and second signal generating means 20, 30 function simultaneously.

Referring now more particularly to the first signal generating means 20, that means includes a rotating disk member 21 of transparent or translucent material bearing a number of generally radially directed lines thereon. Positioned to one side of the disk member 21 is an appropriate light source 22, with a photosensitive electrical device 24 being disposed on the opposite side of the disk member 21. Between the photosensitive device 24 and the disk member 21 is positioned a transparent or translucent line member 25. Due to this arrangement, light from the light source 22 impinging on the photosensitive device 24 is modulated by rotation of the disk member 21 and the generation of a moire pattern with relative movement of the lines on the disk member 21 and the line member 25. Rotation of the disk member 21 is coordinated through rotation of the tire mounting shaft 11 by means of a disk shaft 26, driven and drive pulleys 28, 29 and a drive belt 31 extending therebetween.

Inasmuch as the construction and arrangement of the second signal generating means 30 is generally similar to the construction and arrangement of the first signal generating signal means 20, it is not believed necessary or desirable to repeat at length the above description. Instead, it is believed sufficient to note that the disk member of the second signal generating means 30 is driven in coordination with the linear surface speed of the peripheral crown surface 14 of the tire 12 being buffed by means of a surface engaging roller 34. As will be understood, it is desirable that the apparatus will provide means for biasing the roller 34 against the surface 14 of the tire, centrally of the width of that surface. Perferably, this biasing means is arranged for coordination with operation of the buffing apparatus 10, to withdraw the roller 34 from engagement with the tire during mounting and demounting of the tire, while maintaining engagement of the roller 34 with the tire during the buffing process.

The trains of electrical pulses which are simultaneously generated by the first and second signal generating means 20, 30 are delivered to circuit means generally indicated in FIG. 1 at 40 and electrically connected with the signal generating means 20, 30. The circuit means 40 performs the function of displaying the ratio of the number of pulses in one train to the number of pulses in the other train as indicative of the measurement of the tire being buffed. The manner in which this function is achieved may be more clearly understood from more detailed description of the block diagram presented in FIG. 1 and the detailed circuitry of FIG. 4.

More particularly, pulses originating with the photosensitive devices of the signal generating means 20, 30 are shaped to a predetermined generally uniform characteristic before leaving the generating means. The shaped pulses thus delivered from the first signal generating means 20 are passed to a period counter 41 and associated memory devices as described more fully hereinafter. The period counter 41 controls operation of a gate device 42, which in turn controls the admission of pulses from the second signal generating means 30 to a diameter counter 44 and associated memory devices as described more fully hereinafter. By this coordination, a method is accommodated in which a predetermined number of pulses in the first signal train are counted, the number of pulses which occur in the second pulse train during the period required to count the predetermined number of first train pulses is counted, and the number of second train pulses counted during the period is then displayed digitally. This digit display is indicative of the diameter of the tire being buffed, as described more fully hereinafter.

Referring now to the more detailed circuit diagrams set forth in the accompanying drawings, the period counter 41 includes a plurality of large scale integrated circuit devices 50, preferably of the type identified as 7490, arranged as a counter capable of receiving a predetermined count. The counter devices 50 are additionally connected with large scale integrated circuit devices 51 arranged to operate as bi-stable multivibrators or flip-flops. The function of the flip-flop devices 51, which preferably are of the type known as 7474, is to control successive cycles of counting the desired predetermined number of counts in the counter devices 50, while also controlling the gate device 42. The gate device 42 preferably is a portion of an integrated circuit device of the type known as 7400.

The coordinated operation of the flip-flop devices 51, counter devices 50 and the gate device 42 is such that successive cycles of counting a desired predetermined number occur. That is, as the period counter 41 becomes filled by counting the predetermined number of pulses originating from the first signal generating means 20, the flip-flop devices 51 change state to block passage of pulses from the second signal generating means 30 through the gate device 42 and emit a latch enable signal referred hereinafter. Immediately thereafter, the gate device 42 is reopened to again permit passage of signals from the second signal generating means 30.

The diameter counter 44 and associated display includes a plurality of large scale integrated circuit devices 54 functioning as counter devices and preferably of type 7490. Additionally, a plurality of large scale integrated circuit devices 55, preferably type 7475, function as by-stable multivibrators or flip-flops and provide a shift register or memory feature. The memory flip-flop devices 55 are operatively connected with an appropriate digital display such as light emitting diode devices, in order to display digitally and for ready comprehension the count accumulated in the diameter counter within any given period.

More particularly, the memory flip-flop devices 55 are operatively connected to receive the latch enable signal emitted from the flip-flop devices 51 of the period counter 41. On receipt of such a latch enable signal, the flip-flop devices 55 are set in a condition representative of the count then accumulated in the counter devices 54, during the interval that the passage of pulses from the second generating means 30 through the gate device 42 is precluded. In so setting the memory flip-flop devices 55, any previous indication retained therein is cleared and the associated display devices change (if necessary) to indicate the new information retained in the memory flip-flop devices. Immediately thereafter, the counter devices 54 are cleared in order that a new accumulation in the diameter counter 44 may begin.

In one operating embodiment of this invention, the signal generating devices 20, 30 have been constructed to emit a train of 200 pulses for each single revolution of the disc members disposed therewithin. Further, the driven and drive pulleys 28, 29 used in conjunction with the first signal generating means 20 have been selected in such a manner as to provide a 5 to 1 ratio, resulting in emission of a train of 1000 pulses for each single revolution of the tire mounting shaft 11. The surface contacting roller 34 of the second signal generating means 30 has been selected to have a diameter of 2 inches. The resulting mathematical effect is that the ratio of pulses in the second pulse train to 1000 pulses in the first pulse train is a direct digital equivalent to the diameter of the crown surface 14 of the tire 12, measured in inches to one-hundredth of an inch. Thus, the display of the ratio, achieved by accumulating 1000 counts in the period counter 41, directly displays the diameter in inches and hundredths of the tire being buffed.

While such operation is desirable where rotational loads cause fluctuations in the rotational speed of the tire or workpiece, it will be recognized that generation of a known frequency of pulses may suffice for the first pulse train where accuracy of rotational speed is otherwise assured.

In the drawings and specification, there has been set forth a preferred embodiment of the invention, and although specific terms are employed, they are used in a generic and descriptive sense only and not for purposes of limitation.

That which is claimed is:

1. In an apparatus for preparing a previously used pneumatic rubber tire for retreading and having
   driven shaft means for mounting a tire and for rotating the tire during removal of rubber therefrom, and
   means mounted in spaced relation to said shaft means for engaging a peripheral crown surface of a tire mounted thereon and for removing rubber therefrom during rotation of the tire,
   an arrangement for measuring a physical dimension of a tire during removal of rubber therefrom and comprising:
   first signal generating means for generating a train of electrical pulses characterizing the rotational speed of the tire being buffed,
   second signal generating means for generating a train of electrical pulses characterizing the linear surface speed of the peripheral crown surface of the tire being buffed, and
   circuit means electrically connected with said first and second signal generating means for receiving said pulse trains and for displaying a ratio of a number of pulses in one train to a number of pulses in the other train as indicative of a physical dimension of the tire being buffed.

2. Apparatus according to claim 1 wherein said circuit means comprises:
   period counter means electrically connected with said first signal generating means for receiving said first pulse train and for counting pulses in said first pulse train,
   diameter counter means electrically connected with said second signal generating means for receiving said second pulse train and for counting pulses in said second pulse train, and
   gate means electrically connected with said period counter means and operatively interposed between said diameter counter means and said second signal generating means for controllably determining the period during which pulses in said second pulse train are counted in response to the counting of pulses in said first pulse train.

3. Apparatus according to claim 1 wherein said circuit means comprises memory means for receiving coded information indicative of a numerical value of the diameter of the tire and for retaining such coded information and numerical display means operatively connected with said memory means for displaying digits corresponding to the numerical value of diameter retained in said memory means.

4. Apparatus according to claim 1 wherein each of said first and second signal generating means comprises driven shaft means mounted for being driven in rotation by a corresponding one of said shaft means for mounting the tire and said peripheral crown surface of the tire, disc means mounted on said driven shaft means for rotation therewith and having radially spaced indicia means, and sensor means mounted adjacent said disc means and responsive to movement of said indicia means for generating a train of electrical pulses.

5. A method of displaying a diametrical measurement of a tire during rotation thereof about a mounting shaft and buffing of the peripheral crown surface of the tire, the method comprising the steps of:
   buffing a peripheral crown surface of a tire, while generating a first train of electrical pulse signals characterizing the rotational speed of the tire about the mounting shaft, while simultaneously
   generating a second train of electrical pulse signals characterizing the linear surface speed of the peripheral crown surface, and
   receiving the simultaneous first and second pulse trains while displaying the ratio of pulses in the second train to pulses in the first train as indicative of the diameter of the tire.

6. A method of displaying the diametrical measurement of a tire during rotation thereof about a mounting shaft and buffing of the peripheral crown surface of the tire, the method comprising the steps of:
   generating a first train of electrical pulse signals characterizing the rotational speed of the tire about the mounting shaft, while simultaneously
   generating a second train of electrical pulse signals characterizing the linear surface speed of the peripheral crown surface,
   counting pulses in said first pulse train and determining a period during which a predetermined number of first train pulses are counted,
   opening a gate in response to initiation of the period for counting first train pulses,
   closing the gate on termination of the period for counting of first train pulses,
   counting pulses in the second pulse train during the period that the gate is open,
   registering in a memory the number of second train pulses counted during the period that the gate is open and retaining the registered count during a next subsequent counting period, and
   displaying digits corresponding to the numerical count retained in the memory and indicative of the diameter of the tire.

7. A method of displaying a measurement of a tire during rotation thereof about a mounting shaft and buffing of the peripheral crown surface of the tire, the method comprising the steps of:
- generating a first train of electrical pulse signals characterizing the rotational speed of the tire about the mounting shaft, while simultaneously
- generating a second train of electrical pulse signals characterizing the linear surface speed of the peripheral crown surface,
- counting pulses in said first pulse train and determining a period during which a predetermined number of first train pulses are counted,
- opening a gate in response to initiation of the period for counting first train pulses,
- closing the gate on termination of the period for counting of first train pulses,
- counting pulses in the second pulse train during the period that the gate is open,
- registering in a memory the number of second train pulses counted during the period that the gate is open and retaining the registered count during a next subsequent counting period, and
- displaying digits corresponding to the numerical count retained in the memory.

8. In an apparatus for preparing a previously used pneumatic rubber tire for retreading and having driven shaft means for mounting a tire and for rotating the tire during removal of rubber therefrom, and
- means mounted in spaced relation to said shaft means for engaging a peripheral crown surface of a tire mounted thereon and for removing rubber therefrom during rotation of the tire,
- an arrangement for measuring the diameter of a tire during removal of rubber therefrom and comprising:
- first signal generating means for generating a train of electrical pulses characterizing the rotational speed of the tire being buffed,
- second signal generating means for generating a train of electrical pulses characterizing the linear surface speed of the peripheral crown surface of the tire being buffed, and
- circuit means electrically connected with said first and second signal generating means for receiving said pulse trains and for displaying the ratio of the number of pulses in one train to the number of pulses in the other train as indicative of the diameter of the tire being buffed.

9. In an apparatus for preparing a previously used pneumatic rubber tire for retreading and having
- driven shaft means for mounting a tire and for rotating the tire during removal of rubber therefrom, and
- means mounted in spaced relation to said shaft means for engaging a peripheral crown surface of a tire mounted thereon and for removing rubber therefrom during rotation of the tire,
- an arrangement for measuring a physical dimension of a tire during removal of rubber therefrom and comprising:
- first signal generating means for generating a first train of electrical pulses characterizing the rotational speed of a tire,
- second signal generating means operatively engaging the peripheral crown surface of the tire for generating a second train of electrical pulses characterizing the linear surface speed of the peripheral crown surface,
- period counter means electrically connected with said first signal generating means for receiving said first pulse train and for counting pulses in said first pulse train,
- dimension counter means electrically connected with said second signal generating means for receiving said second pulse train and for counting pulses in said second pulse train,
- gate means electrically connected with said period counter means and operatively interposed between said dimension counter means and said second signal generating means for controllably determining a period during which pulses in said second pulse train are counted in response to the counting of pulses in said first pulse train,
- memory means electrically connected with said dimension counter means for receiving therefrom the count accumulated during said counting period and for retaining such count during a next subsequent counting period, and
- numerical display means operatively connected with said memory means for displaying digits corresponding to the numerical count retained in said memory means and indicative of a physical dimension of the tire.

10. In an apparatus for preparing a previously used pneumatic rubber tire for retreading and having
- driven shaft means for mounting tire and for rotating the tire during removal of rubber therefrom, and
- means mounted in spaced relation to said shaft means for engaging a peripheral crown surface of a tire mounted thereon and for removing rubber therefrom during rotation of the tire,
- an arrangement for measuring the diameter of a tire during removal of rubber therefrom and comprising:
- first signal generating means for generating a first train of electrical pulses characterizing the rotational speed of the tire,
- second signal generating means operatively engaging the peripheral crown surface of the tire for generating a second train of electrical pulses characterizing the linear surface speed of the peripheral crown surface,
- period counter means electrically connected with said first signal generating means for receiving said first pulse train and for counting pulses in said first pulse train,
- diameter counter means electrically connected with said second signal generating means for receiving said second pulse train and for counting pulses in said second pulse train,
- gate means electrically connected with said period counter means and operatively interposed between said diameter counter means and said second signal generating means for controllably determining a period during which pulses in said second pulse train are counted in response to the counting of pulses in said first pulse train,
- memory means electrically connected with said diameter counter means for receiving therefrom the count accumulated during said counting period and for retaining such count during a next subsequent counting period, and
- numerical display means operatively connected with said memory means for displaying digits corresponding to the numerical count retained in said memory means and indicative of the diameter of the tire.

11. A method of displaying a measurement of a tire during rotation thereof about a mounting shaft and buffing of the peripheral crown surface of the tire, the method comprising the steps of:

buffing a peripheral crown surface of a tire, while generating a first train of electrical pulse signals characterizing the rotational speed of the tire about the mounting shaft, while simultaneously generating a second train of electrical pulse signals characterizing the linear surface speed of the peripheral crown surface, and receiving the simultaneous first and second pulse trains while displaying the ratio of pulses in the second train to pulses in the first train as indicative of a physical dimension of the tire.

* * * * *